United States Patent [19]

Bittner et al.

[11] Patent Number: 5,039,505

[45] Date of Patent: Aug. 13, 1991

[54] METHOD OF PREPARING NA$_2$S (III)

[75] Inventors: Friedrich Bittner, Bad Soden; Walter Hinrichs, Bruehl; Lutz Hippe, OberRamstadt; Ludwig Lange, Bruehl; Erich Splett, Huerth-Berrenrath, all of Fed. Rep. of Germany

[73] Assignee: Degussa Aktiengesellschaft, Frankfurt am Main, Fed. Rep. of Germany

[21] Appl. No.: 510,267

[22] Filed: Apr. 19, 1990

[30] Foreign Application Priority Data

Apr. 22, 1989 [DE] Fed. Rep. of Germany ....... 3913257

[51] Int. Cl.$^5$ .................... C01B 17/00; C01B 17/22
[52] U.S. Cl. .................................. 423/565; 423/566.2
[58] Field of Search ............................. 423/565, 566.2

[56] References Cited

U.S. PATENT DOCUMENTS 4,640,832  2/1987  Bittner et al. ...................... 423/565

Primary Examiner—Gary P. Straub
Assistant Examiner—Timothy C. Vanoy
Attorney, Agent, or Firm—Beveridge, DeGrandi & Weilacher

[57] ABSTRACT

A method of preparing sodium monosulfide by means of reacting sodium and sulfur under protective gas, wherein sodium monosulfide is placed in a first stage in a receiver in a finely distributed, solid state, the initial material is preheated to 120°–150° C. and sulfur and sodium are alternately added in the required amount ratio under intensive mixing, whereby the temperature of the reation mixture is maintained at 120°–250° C., and in a second stage the formed initial product is allowed to continue to react or postreact under continuation of the mixing at 250°–480° C., until a Na$_2$S content of at least 95% by weight has been attained.

7 Claims, No Drawings

METHOD OF PREPARING NA₂S (III)

INTRODUCTION AND BACKGROUND

The present invention relates to a method of preparing sodium monosulfide by means of reacting sodium and sulfur under a protective gas.

Sodium monosulfide, Na$_2$S, is an important reagent for introducing sulfur into organic molecules. Several methods are known according to which this compound can be prepared. It can be obtained for example, by reacting sodium salts with hydrogen sulfide in aqueous or alcoholic solutions or by the reduction of sodium sulfate with carbon or hydrogen. The known methods have the problem that products contaminated with reactants always accumulate which must be separated from the impurities by being dissolved in suitable solvents and by filtering.

Since the elements sodium and sulfur react extremely vigorously with one another (enthalpy of formation for Na$_2$S: $\Delta HB = -389.1$ kJ/mole), the direct preparation of Na$_2$S from the elements which are commercially available in great purity was not feasible for industrial purposes in the past.

Moisture-free Na$_2$S in sufficiently pure form was only obtainable by a process of dewatering the hydrate Na$_2$S . 9H$_2$O under an atmosphere of hydrogen, according to which this hydrate had to be prepared by means of reacting sodium hydrogen sulfide with NaOH in a polar solvent (Kirk-Othmer, 3d edition (1982), vol. 18, pp. 793–847, especially pp. 803 and 809).

It is also known from the art; namely, DE-PS 34 36 698 that sodium polysulfides can be prepared from the elements sodium and sulfur in which the sodium and the sulfur are charged under a protective gas in a stoichiometric proportion corresponding to the desired polysulfide in an alternatingly manner into a melt of a polysulfide placed in a reaction receiver. Vigorous agitation is carried out. The portions of reactants are measured in such a manner that during the charging of sodium the reaction mixture remains in the state of an agitatible suspension and that during the charging of the sulfur the latter is allowed to react completely in each instance to form a polysulfide of a higher sulfur content.

It would also be basically possible according to this method to recover sodium monosulfide by providing the required stoichiometric proportion for the bound sulfur and the sodium. However, the method referred to above requires a melt as the reaction medium which consists at least at the final stage of the reaction of Na$_2$S alone. Therefore, an economically feasible reactor material would hardly be available as a consequence of having to withstand the very high melting point of this compound (1180°–1200° C.) and on account of the strong chemical aggressivity of the melt.

SUMMARY OF THE INVENTION

An object of the invention is to provide a method of preparation with which a high-percentage sodium monosulfide can be economically prepared directly from the elements sodium and sulfur without requiring a reaction medium in molten form to be present in the reaction system and using relatively low reaction temperatures.

In attaining the above and other objects, one feature of the invention resides in a method of preparing sodium monosulfide by means of reacting sodium and sulfur under a protective gas in which in a first stage sodium monosulfide, which optionally contains sodium polysulfide, is placed in a reaction receiver in a finely distributed, solid state, the initial material is preheated to 120°–150° C. and liquid or finely divided, solid sulfur and molten sodium are alternatingly added in the required amount ratio under intensive mixing of the resulting reaction mixture. Preferably, the intensive mixing is carried out under conditions of kneading and or grinding. The temperature of the reaction mixture is maintained at 120°–250° C., preferably 140°–200° C., in the first stage. Then in a second stage, the formed initial product after the first reaction stage, which is colored bluish-black, is allowed to continue to react, or post-react under continuation of the mixing with heating to the higher temperature at 250°–480° C., preferably 350°–400° C, until a Na$_2$S content of at least 95% by weight has been attained.

Inert gas, preferably argon, is used as protective gas. The selection of the correct reactor material is also a significant aspect of the invention. According to an advantageous embodiment of the invention, the reaction is carried out in a reactor wherein those parts of the reactor which come into contact with the reaction mixture are fabricated of aluminum alloys, especially AlMg3 or AlMn or sintered alumina or SiC or of glassy carbon. Alternately, the reactor parts can be cladded or coated or jacketed with these materials to protect against corrosion.

DETAILED DESCRIPTION OF THE INVENTION

A particularly important measure in the method of the invention is the use of mixing devices with which the reaction mixture, which passes through various consistency stages in the course of the reaction, can be comminuted as intensively as possible and thoroughly mixed. Devices with kneading and/or grinding action have proven to be especially useful. Examples are trough kneaders mixers with oppositely directed kneading blades and agitator ball mills.

In kneaders, the kneading surfaces should always be covered by the sodium placed in the receiver reactor in the initial stage of the reaction and by the initial product formed, which is colored dark to grey, in the continuing or post reaction in order to avoid corrosion by the aggressive reaction mixture.

The reactor contents passes through various characteristic stages of consistency and coloration during the execution of the method of the invention:

If previously prepared Na$_2$S is placed in a reaction receiver as the reaction medium, it is used in the form of a finely divided powder for the first method stage in the process of the invention.

According to the invention, when the elemental reactants; namely sulfur and sodium are added in alternating fashion, to the reaction vessel characteristic color changes occur in each instance in the reaction mixture:

After the addition of sulfur to the reaction vessel, the reaction mixture turns bluish-black and after the addition of sodium it turns grey; the powdery form of the resulting reaction mixture remains preserved during the entire course of the reaction.

After the charging of the required amount of the elemental reactants to the reaction vessel and the conversion in the first stage, a bluish-black powder results.

In the second method stage, with heating of the reaction mixture to 250°–480° C. with continued comminuting mixing takes place, the powdery nature of the reactor contents remains and the color turns from bluish-black to white.

The method of the invention purposely accepts the accumulation of non-molten solid substance in the reaction medium, during the course of the entire reaction in contrast to the prior known method for preparing sodium polysulfides. As a result the method of the invention allows conversions up to approximately 97% of theory at temperatures which are far below the melting point of the final product.

Of course, any desired polysulfide can also be obtained from the high-percentage sodium monosulfide obtained by means of melting it together with the appropriate amounts of sulfur. The invention is explained in more detail below with reference to the illustrative embodiment.

EXAMPLE

A laboratory kneading machine with a trough of V4A formed from two semicylinders with polished inner walls was equipped with two polished blades of V4A in sigma form mounted in each instance on its own drive shaft.

The lower trough part was formed of a double jacket for receiving a heat-conductive medium. The screwed-on cover of V4A was provided with a connecting piece which was able to be closed with a screw cap and with an introductory tube for introducing the protective gas argon and terminating immediately underneath the cover. Both sodium and sulfur were charged in and the initial product removed through the connecting piece.

The blade speed could be varied between 40-60 rpms. A temperature sensor protective tube formed of V4A was introduced into the trough or the reaction space through one of the four side walls parallel to the shafts on which the blades were mounted. The clear interior length of the trough was 100 mm, its clear width 117 mm and its clear depth 110 mm. The useful volume of this trough was 750 ml. Accordingly, this trough was able to receive approximately 500 g of initial product.

Prior to the start of the batchwise production, the trough was heated, whereby its lower part was loaded with heat-conductive oil with a temperature of 160° C. The trough was flushed with approximately 20 liters argon per hour. Thereafter, 150 g sodium monosulfide, $Na_2S$, were charged in. Molten sodium and sulfur in powder form were alternatingly dosed into the finely ground sodium monosulfide through the connecting piece which was closable with a screw cap.

The amount of sodium per portion was 10 g. The amount of sulfur was approximately 7 g, corresponding to the stoichiometric proportion. A total of 123.4 g sulfur and 117 g sodium were added into the kneader. The dosing of sodium and sulfur was controlled in such a manner that the temperature in the reaction space did not rise higher than 170° C. during the charging operation.

During the portion-by-portion addition of the two elements sodium and sulfur over a time period of approximately hours, the blade speed remained constant at 50 rpms. After the initial product obtained had cooled off, a specimen was taken for analysis.

An analysis yielded:
58.9% by weight total sodium (theoret. 59.0%)
41.0% by weight total sulfur (theoret. 41.0%).

Of the total sulfur, 38.0 sulfur is present in the initial product in the form of the sulfide. The determination of sulfide was performed iodometrically. The total sulfur content was determined after oxidation of the sulfur with $H_2O_2$ in an alkaline medium to the sulfate gravimetrically as $BaSO_4$.

The total sodium content was determined with flame photometry. Sodium which had not participated in the reaction was detected gasometrically. An amount of 5.0% by weight relative to the total mixture was found hereby. The initial product, which contained more than 85% by weight sodium monosulfide, was placed in a laboratory reactor which was able to be heated up to approximately 400° C. for the postreaction of the constituents sodium and sulfur which had not yet reacted to the sulfide.

The cylindrical laboratory reactor consisting of the aluminum alloy AlMg3 with a bottom plate comprised a flangedon cover, likewise of AlMg3, with a connecting piece closable by a screw cap, with an gas introductory tube for introducing the protective gas argon terminating under the cover, with a temperature sensor protective tube and a stuffing box in the cover for passing through the vertically standing blade agitator shaft which was jacketed with AlMg3 and on which the agitator blades of AlMg3 were fastened. The reactor exhibited a clear height of 150 mm and a clear width of likewise 150 mm.

In order to achieve an optimum agitator action in the laboratory reactor, the amount of 300 g initial product had to be doubled. Therefore, the same amount was prepared once again in the manner just described in the laboratory kneading machine.

After 600 g of the black, powdery product from the 2 batches had been filled in, the reactor, provided with heat insulation on its jacket was placed on an infinitely variable electric heating plate and evenly heated to 370° C. during the course of 1.5 hours. The initial product was intensively agitated during the heating. The agitator speed was adjusted to 100 rpms. A strong agitating motor was required for this since the initial product tended to form clumps after reaching a temperature of 300° C. The reactor was flushed during the heating and the postreaction with a current of inert gas of 30 liter per hour.

After cooling, the final product, which was now white, was removed from the reactor and sieved according to size. The mesh size of the sieve was 0.355 mm. Approximately 70% of the sieved reaction product was recovered in this manner as a homogeneous, white powder.

An analysis yielded the following composition:
58.8% by weight Na (theoret. 58.97% by weight)
41.2% by weight S (theoret. 41.03% by weight).

The coarse-particle fraction (sieve retainings) exhibited the composition $Na_2S$; however, it was inhomogeneous as regarded the sulfur content of the individual particle that is, the particle contained in part slight amounts of polysulfide (approximately 1-5% by weight).

The following quantitative balance results from the foregoing:
Material placed in the kneader (total): 150.0 g $Na_2S_4$
Sodium added (total): 359.0 g sodium
Sulfur added (total): 246.8 g
Production of initial product: 600 g
Amount placed in laboratory reactor: 600 g init. prod.
Amount removed from laboratory reactor: 600 g final prod.

Sieve fraction >0.355 mm: 420.0 g sodium monosulfide Na$_2$S

Remainder of inhomogeneous particle fraction >0.355 mm: 180g

The inhomogeneous particle fraction >0.355 mm from the method of preparing Na$_2$S was collected and supplied to the kneader for the first conversion stage. After one hour of grinding at 50 rpms under an atmosphere of argon, a fine powder was obtained which can be placed in the kneader and used for a new batch.

Further variations and modifications of the foregoing will be apparent to those skilled in the art from the foregoing and are intended to be encompassed by the claims appended hereto.

German priority application P 39 13 257.9 is relied on and incorporated by reference.

We claim:

1. A method of preparing sodium monosulfide by means of reacting sodium and sulfur under a protective gas, comprising in a first stage placing sodium monosulfide in a reaction receiver in a finely divided, solid state, preheating said monosulfide to 120°–150° C. and introducing liquid or finely divided, solid sulfur and molten sodium into said receiver in an alternating manner to form a reaction mixture intensively mixing said mixture, maintaining the temperature of the reaction mixture at 120°–250° C., until a bluish-black product is obtained, and in a second stage heating the bluish-black product under intensive mixing at 250°–480° C., until a Na$_2$S content of at least 95% by weight has been attained.

2. The method according to claim 1 wherein heating in the first stage is at 140°–200° C.

3. The method according to claim 1 wherein mixing in the first stage is under kneading, grinding, or kneading and grinding.

4. The method according to claim 1 wherein the heating in the second stage is at 350°–400° C.

5. The method according to claim 1 wherein the mixing in the second stage is continued until the product turns light in color.

6. The method according to claim 1 wherein the sodium and sulfur are dosed into the reaction receiver in a controlled manner such that the temperature of the reaction receiver does not rise above 170° C.

7. The method according to claim 1 wherein said sodium monosulfide in the first stage initially contains sodium polysulfide.

* * * * *